United States Patent

Northcraft

[15] 3,645,153
[45] Feb. 29, 1972

[54] DIFFERENTIAL DRIVE MECHANISM FOR VEHICLES

[72] Inventor: Ray V. Northcraft, 659 Cumberland Ave., Chambersburg, Pa. 17201

[22] Filed: Apr. 7, 1970

[21] Appl. No.: 26,268

[52] U.S. Cl. ............................................. 74/700, 180/70
[51] Int. Cl. ........................................................ F16h 37/08
[58] Field of Search ............... 74/694, 700, 701, 325; 180/70

[56] References Cited

UNITED STATES PATENTS

| | | | |
|---|---|---|---|
| 1,983,955 | 12/1934 | Soden-Fraunhofen | 74/700 |
| 3,503,274 | 3/1970 | Howard | 74/325 |
| 2,245,078 | 6/1941 | Padgett | 74/700 |
| 2,612,786 | 10/1952 | Schmitter | 74/325 |
| 2,661,634 | 12/1953 | Bechman et al. | 74/700 |
| 2,776,572 | 1/1957 | Walter | 74/700 |
| 2,978,054 | 4/1961 | Kraus | 74/700 |

*Primary Examiner*—C. J. Husar
*Attorney*—Beveridge & De Grandi

[57] ABSTRACT

A differential gear drive mechanism for a vehicle employing an input drive shaft and a differential pinion shaft journaled for rotation about spaced parallel axes within a differential housing and meshing gears mounted on each shaft for connecting the two. The gear may quickly be replaced to change the drive ratio of the mechanism by removing a cover plate over an access opening in the housing adjacent one end of the two shafts. A selectively operable coupling device is provided to connect and disconnect one of the shafts from the gear train, and parallel gear trains may be employed between the two shafts with the coupling device being operable to connect one or the other gear trains alternatively to the associated shaft to permit the drive ratio to be changed without opening the differential housing.

13 Claims, 5 Drawing Figures

PATENTED FEB 29 1972 3,645,153

INVENTOR
RAY V. NORTHCRAFT

BY Beveridge & DeGrandi

ATTORNEYS

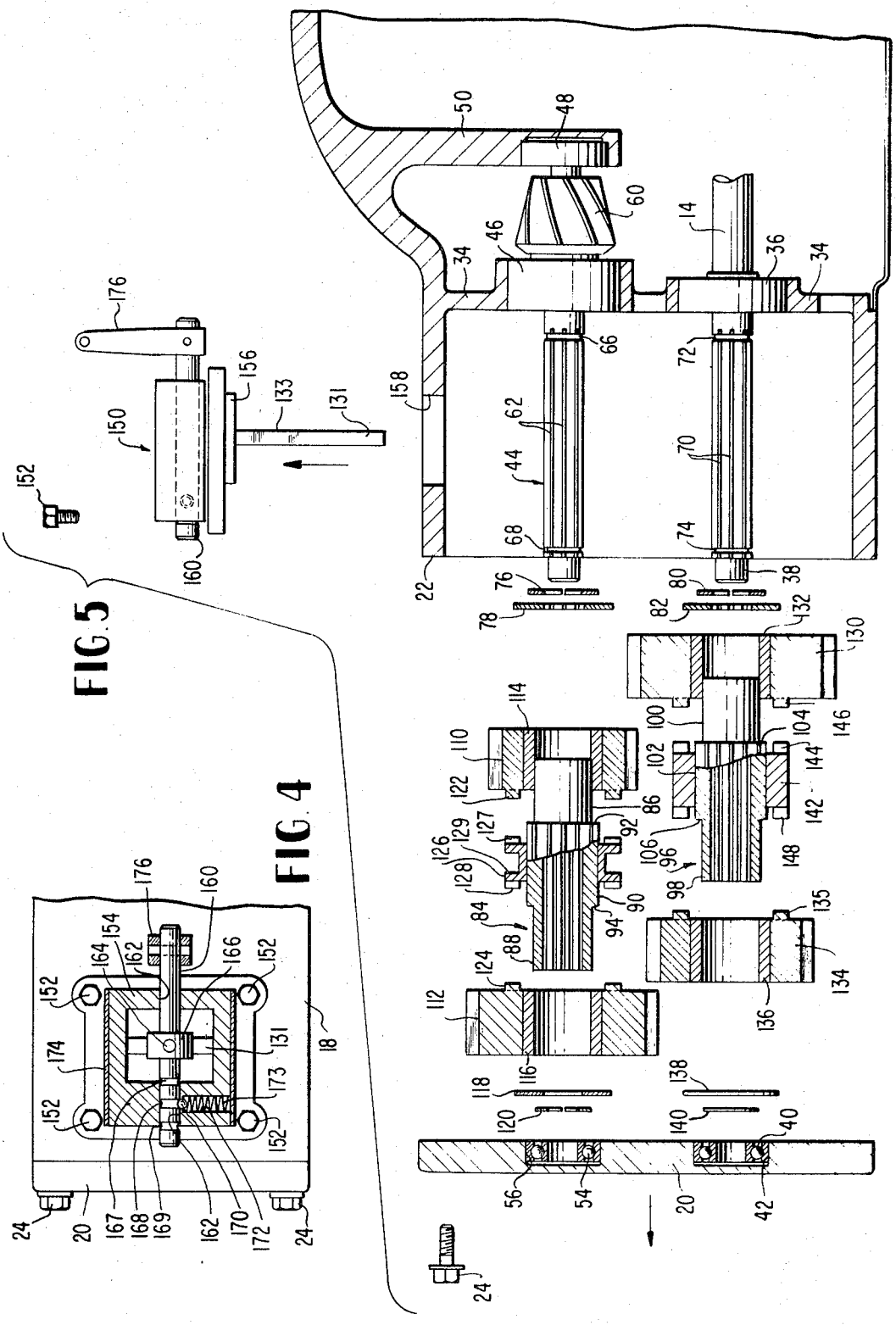

DIFFERENTIAL DRIVE MECHANISM FOR VEHICLES

Field of the invention

This invention relates to vehicle axle drive mechanisms, and more particularly to differential gear drive mechanisms of the type incorporating special provisions for quick replacement of certain elements of the gear train to change the drive ratio of the mechanism.

DESCRIPTION OF THE PRIOR ART

It has been known in the past to employ a differential drive mechanism for a motor vehicle which incorporated special features to facilitate rapid replacement of two meshing gears to change the drive ratio of the vehicle. The ability to change the drive ratio of the vehicle within a very few minutes has resulted in such devices being widely used in certain types of vehicles such as high-speed racing cars. Further, this facility for rapid gear replacement has resulted in such differential drive mechanisms becoming known generically, at least in the racing community, as "quick-change differentials," and this term will sometimes be used hereinafter to designate such a differential, it being understood that the term "quick-change" refers to this facility for rapid gear replacement.

In prior art vehicles employing a quick-change differential, power from the vehicle engine has normally been transmitted to the vehicle drive shaft through a gear transmission, with the rear end of the vehicle drive shaft journaled for rotation within the differential housing. A differential pinion drive shaft is mounted within the differential housing for rotation about its axis parallel to the drive shaft, with the end of the drive shaft and the pinion shaft being positioned adjacent an access opening normally sealed by a removable cover plate. A pair of meshing gears were mounted, one on the end of the drive shaft and the other on the end of the pinion shaft, to rotatably connect the two shafts and drive the differential pinion. To change the drive ratio for the vehicle, it was only necessary to remove the cover plate, pull the gears from the ends of the drive shaft and the pinion shaft, and replace these gears with a pair of gears having the desired gear ratio. The entire procedure for changing the gear ratio could be completed by skilled mechanics in the span of a few minutes.

While the prior art quick-change differentials permitted the skilled race driver to evaluate the racing conditions, including the conditions of the track, a short time before the start of a race, and to install the gear ratio which he considered desirable for the particular race, these prior art devices were not entirely satisfactory for several reasons. For example, racing conditions frequently varied during the course of a long race so that an ideal gear ratio for the beginning of the race may not necessarily be appropriate after the track conditions or weather have changed during the progress of the race. Further, these prior art devices still required use of a separate gear transmission which could be disengaged to interrupt the drive chain from the engine to the wheels. These gear transmissions were particularly objectionable in many race vehicles because of the practical necessity of locating the transmission in close proximity to the cockpit, thereby continuously presenting a hazard to the driver in the event of failure of the transmission. Further, such transmissions, particularly in high-speed, powerful vehicles of the type employed, for example at the Indianapolis Motor Speedway, were frequently simple in-and-out boxes, so called because their function was to place the vehicle in or out of gear depending on the position of the two-position shift mechanism.

Summary of the Invention

The foregoing and other defects of the prior art quick-change differential drive mechanisms are overcome in a differential drive according to the present invention which employs two independent sets of gears, each operable to drivingly connect the pinion shaft to the vehicle drive shaft, with a selectively operable coupling mechanism for alternatively coupling one or the other sets of gears in the drive chain, thereby permitting the gear ratio of the differential to be changed without dismantling any portion of the differential. The coupling mechanism may also be employed to uncouple both sets of gears, thereby interrupting the drive chain to the vehicle axles and eliminate the necessity for the conventional in-and-out box employed in racing vehicles. The two sets of gears may be mounted on a pair of sleeves which, in turn, are mounted on the respective shafts so that the gears from each shaft may be removed simultaneously by simply pulling the sleeve from the end of the shaft. Thus, the two sets of gears may be replaced as quickly as one set in the previous devices, thereby retaining the true quick-change characteristic of the differential.

BRIEF DESCRIPTION OF THE DRAWINGS

Other advantages of the invention will become apparent from the following detailed description, taken with the drawings, in which.

FIG. 4 is a fragmentary sectional view taken on line 4—4 of FIG. 2; and

FIG. 5 is an exploded view partially in section, of a portion of the mechanism shown in FIG. 2.

DESCRIPTION OF A PREFERRED EMBODIMENT

Figure 3:
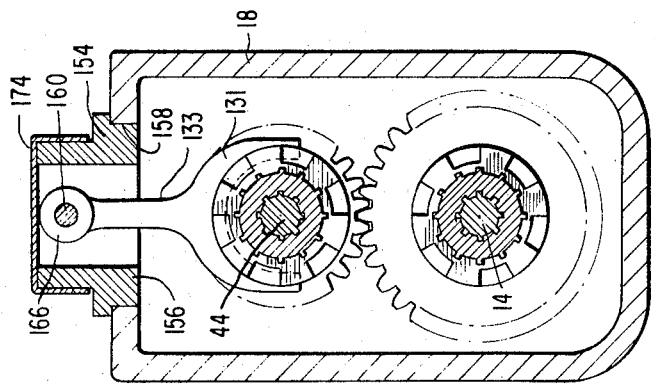
FIG. 3 is a further enlarged fragmentary sectional view taken on line 3—3 of FIG. 2.
Figure 1:
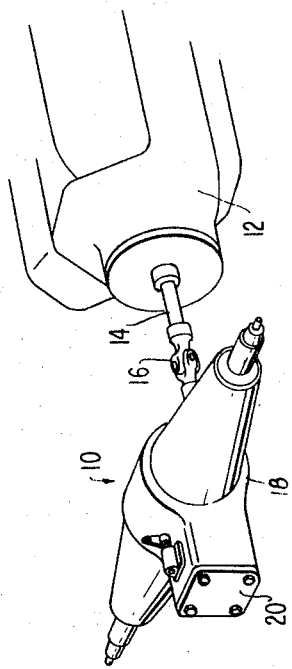
FIG. 1 is a fragmentary schematic view of a power system for motor vehicle incorporating applicant's improved quick-change differential.

Referring now the drawings in detail, a differential drive gear mechanism embodying the present invention is indicated generally by the reference numeral 10 and illustrated in FIG. 1 as being directly connected to the crank shaft of an internal combustion engine 12 by drive shaft 14 incorporating a universal joint 16. Differential 10 includes a hollow gear housing 18 having an open back end normally closed by a removable cover plate 20 and retained in sealing engagement with the open vertical face 22 of the housing 18. Plate 20 is releasably retained on the housing by a plurality of threaded bolt members 24. As most clearly seen in FIG. 2, the vehicle drive shaft, or input shaft 14 for the differential extends through an opening 26 in the forward wall 28 of housing 18 and is journaled for rotation therein by an antifriction bearing 30. A suitable lubrication seal 32 is positioned within opening 26 and seals the input shaft 14.

An intermediate wall 34 is integrally cast in housing 18 and provides a support for a second antifriction bearing assembly 36 supporting input shaft 14. Shaft 14 extends rearwardly from bearing 36 and terminates in the free cylindrical end portion 38 adjacent the access opening defined by the vertical end face 22 of housing 18. End 38 is normally journaled for rotation by an antifriction bearing 40 mounted within a bearing support 42 carried by cover plate 20.

A pinion shaft 44 is journaled for rotation about an axis spaced from and parallel to input shaft 14 within housing 18 by a main bearing 46 mounted in wall 34 and a forward antifriction bearing 48 supported by an arm 50 cast integrally with and projecting into housing 18 from a top wall thereof adjacent the differential bevel drive gear 52. A third antifriction bearing 54 mounted in a bearing support 56 on end plate 20 normally supports the rear end 58 of pinion drive shaft 44. A pinion gear 60 mounted on the forward end of pinion drive shaft 44 meshes with bevel drive gear 52 to transmit power to the axle drive differential.

As best seen in FIG. 5, the portions of input shaft 14 and pinion drive shaft 44 rearward of wall 34 are identical in size and configuration. Referring specifically to pinion drive shaft 44, it is seen that this shaft is formed with external splines, indicated generally at 62, from adjacent the bearing 46 to a position adjacent the cylindrical end 54. A first cylindrical groove 66 is formed in shaft 44 in rearwardly spaced relation to bearing 46, and a second cylindrical groove 68 is formed in the shaft adjacent the rear end of the shaft. Similarly, input shaft 14 has external splines 70 formed thereon, and a pair of annular grooves 72, 74 formed therein with groove 72 being positioned adjacent bearing 36 and groove 74 being positioned adjacent the cylindrical rear end portion 38. A snapring 76 is positioned in groove 66 to axially position an internally splined thrust washer 78 telescopingly received on the shaft 44. A similar snapring 80 mounted in groove 72 axially positioned an internally splined thrust washer 82 on shaft 14.

An internally splined, elongated sleeve 84 is mounted on shaft 44 for rotation therewith, with the forward end of sleeve 84 bearing against and being positioned by thrust washer 78. Sleeve 84 has smooth, cylindrical external end portions 86, 88 joined by an enlarged, externally splined central portion 90, with the radial end faces of enlarged segment 90 defining a pair of shoulders 92, 94. A similar sleeve 96 having smooth cylindrical outer end portions 98, 100, joined by an enlarged externally splined central portion 102 mounted on shaft 14. Opposed ends of enlarged central portion 102 define a pair of radial shoulders 104, 106.

A pair of spur gears 110, 112 are mounted on the cylindrical end portions 86, 88, respectively of sleeve 84 as by bronze bushings 114, 116. The bushings 114, 116, engage shoulders 92, 94, respectively to limit axial movement of the gears 110, 112 toward one another, and the forward end of gear 110 and bushing 114 engages thrust washer 78 to limit forward movement of the gear on shaft 44. A second internally splined thrust washer 118 is mounted on shaft 44 and retained in position engaging the rear end of bushing and gear 112 by a snap ring 120 positioned in groove 68. Spur gears 110, 112 each have an annular row of crown gear teeth 122, 124, respectively, formed on opposed radial faces thereof. A double-faced crown gear 126, having rows of crown gear teeth 127, 128 formed on its radial faces, is mounted on the enlarged central splined portion 90 of shaft 84 with internal splines on crown gear 126 engaging the external splines on enlarged portion 90 to prevent relative rotation therebetween. An annular groove 129 formed around the outer periphery of crown gear 126 receives the forked portion 131 of a yoke 133 for sliding crown gear 126 axially along the enlarged central splined portion 90 of sleeve 84. The tolerances between the external splines on central portion 90 and the internal splines in the crown gear 126 are sufficient to permit axial movement without undue frictional resistance.

Figure 2:
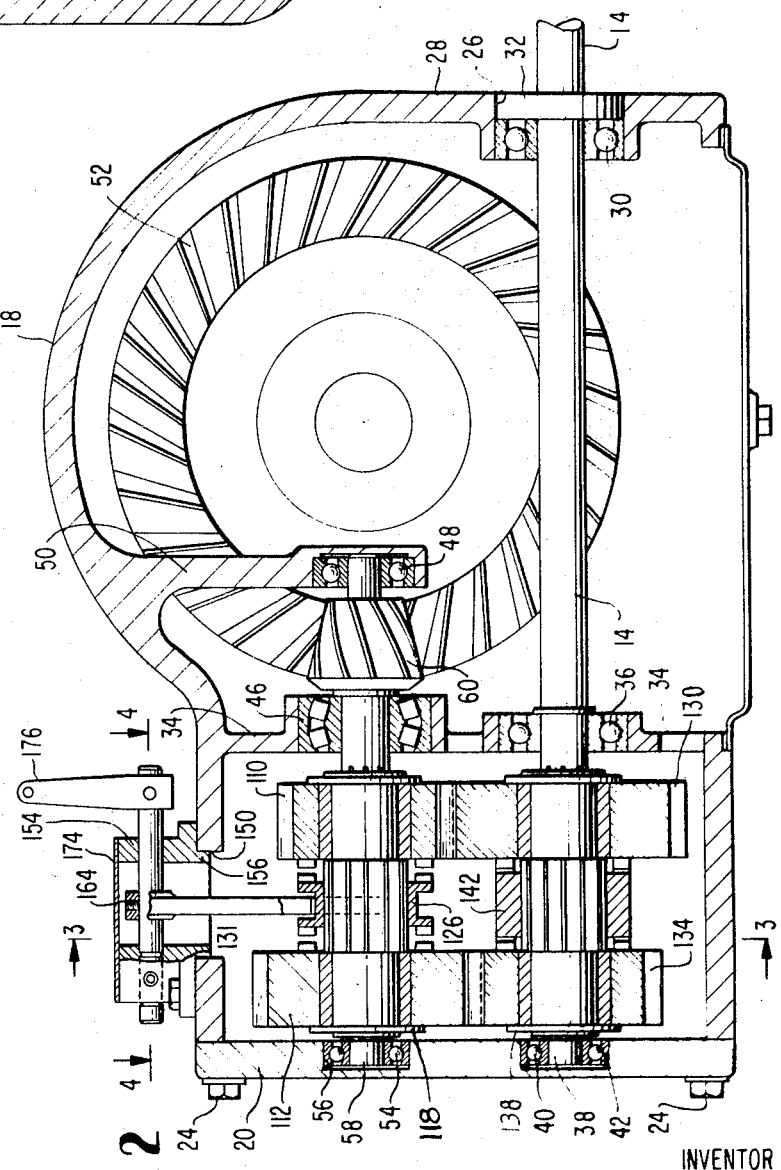
FIG. 2 is an enlarged elevation view, in section, of the differential drive mechanism illustrated in FIG. 1.

As best seen in FIG. 2, the transverse, or axial dimension of crown gear 126 is substantially less than the length of enlarged central portion 90 of sleeve 84 so that when crown gear 126 is positioned halfway between shoulders 92 and 94, the crown gear teeth thereon do not engage the crown gear teeth on either gear 110 or gear 112. However, crown gear 126 may be shifted axially along sleeve 84 to mesh with the crown gear teeth 122 or 124, as desired, in the manner to be more fully explained herein below.

A spur gear 130 is journaled for rotation on the cylindrical end portion 100 of sleeve 96 as by a bronze bushing 132, and a similar spur gear 134 is journaled for rotation on the cylindrical end portion 98 by bronze bushing 136. With the sleeve 96 mounted on shaft 14, gear 130 is retained against axial movement by the thrust washer 82 bearing against the end of bushing 132 and the end of gear 130, and by shoulder 104 bearing against the end of bushing 132. Similarly, gear 134 is retained against axial movement by the shoulder 106 and by an internally splined thrust washer 138 mounted on the end of shaft 14 and retained in place by a snapring 140 positioned within groove 74. A cylindrical sleeve 142 is mounted on the enlarged central portion 102 on sleeve 96 and retained thereon against rotation by internal splines mating with the external splines on the enlarged central portion. An annular row of crown gear teeth 144 formed on the forward face of sleeve 142 is positioned to engage and mesh with a mating row of crown gear teeth 146 formed on the rear face of gear 130 and an annular row of crown gear teeth 148 formed on the rear end of sleeve 142 meshes with a mating row of crown gear teeth 135 formed on the forward face of gear 134. Thus, sleeve 142 positively locks both gears 130 and 134 for simultaneous rotation with input shaft 14. Further, gear 130 positively engages and drives gear 110, and gear 134 positively engages and drives gear 112 so that rotation of input shaft 14 will positively drive both gears 110 and 112 about their common axis but at different rates depending upon the gear ratio between the driven gears 110, 112 and the mating driving gears 130, 134.

Preferably the crown gear teeth on the sleeve 142 are identical to the rows of crown gear teeth on the crown gear 126, and the rows of crown gear teeth on the face of the respective spur gears are also identical, as are the bronze bushings supporting the respective spur gears so that the gears are completely interchangeable. For example, gears 110 and 130 may be exchanged one for the other, with the only difference being the difference in the drive ratio of the differential drive mechanism.

As previously stated crown gear 126 may be shifted axially along sleeve 84 to engage the forward row bushing of crown gear teeth with the row 122 of crown gear teeth on gear 110 to rotatably lock the spur gear 110 to the pinion shaft 44 through the splined connection between crown gear 126 and sleeve 84 and the splined connection between sleeve 84 and shaft 44. In this forward position, the pinion shaft 44 will be driven at a rate slightly greater than the rate of rotation of input shaft 14 due to the drive gear 130 being of a size greater than the driven gear 110. Also, in this position, gear 112 will be driven by the gear 134 for rotation about its axis but at a rate slightly less than the rate of rotation of sleeve 84. To drive the pinion shaft 44 at a reduced rate, it is only necessary to shift the crown gear 126 rearward to engage the crown gear teeth 128 with the crown gear teeth 124, thereby releasing gear 110 for free rotation on the forward end portion 86 of sleeve 84 and locking gear 112 to sleeve 84 for simultaneous rotation therewith. Since the diameter of driving gear 134 is slightly less, in the illustrated embodiment, than that of driven gear 112, the speed of the differential drive will be reduced.

As previously stated, in the central, or neutral, position illustrated in FIGS. 2 and 4 of the drawings, both gears 110 and 112 will be free to rotate about the sleeve 84, in which position the pinion shaft is disengaged from the driven input shaft. To shift the crown gear 126 between its three positions, a slider bar shift mechanism 150 is mounted on a upper horizontal surface of housing 18 as by bolts 152. Shift mechanism 150 includes a hollow base member 154 having a downward projecting flange 156 for positioning the mechanism in an opening 158 in housing 18. An elongated bar 160 is slidably mounted in a bore 162 of block 154, and a setscrew 164 rigidly attaches a collar 166 on the upper end of yoke 133 to the bar 160. Three annular, trough-shaped grooves 167, 168, 169 are formed around one end of shaft 160 in axially spaced relation to one another, and a ball detend mechanism including a ball 170 positioned in a bore 172 in block 154 and urged by a spring 173 into engagement with the bar to resiliently retain bar 160 in one of three positions in which the ball 170 is projected into one of the annular grooves. A metal cover 174 is positioned over block 154 and retains spring 172 in position.

As seen in FIG. 4, bar 160 may be manually slid axially through bore 162 by a crank 176 which may be pivotally connected to an operating linkage, not shown, extending into the cockpit or passenger compartment of a vehicle. The positions of the annular grooves 167, 168, 169 correspond, respectively, to the positions of crown gear 126 in engagement with the spur gear 112, the neutral position, and in engagement with the spur gear 110. Since yoke 133 is rigidly attached to bar 160, gear 126 will be axially slid along sleeve 84 by movement of the bar 160 through block 154.

As will be apparent from FIG. 2, one of the two gear ratios of the differential may quickly be changed by the simple expedient of removing cover plate 20 with bearings 40 and 54 mounted therein, and removing snaprings 120 and 140. Mating spur gears 134 and 112 may then be slid axially from the ends of their respective supporting sleeve members and quickly replaced with another pair of gears having the desired gear ratio. Alternatively, the two gears may simply be exchanged, one for the other, and the mechanism reassembled by again installing the lock washers 118, 138 and snaprings 120, 140, then reinstalling cover plate 20 and the bearings supported thereby.

To change the entire gear mechanism, the four bolts 152, retaining block 154 on the top of housing 18 are first removed, then the cover plate 20 and snap rings 120 and 140 are removed so that the sleeves 84 and 96 may be bodily slid from their supporting shafts, thereby simultaneously removing both sets of mating gears. Similarly, the desired gears may be installed on the sleeves and assembled onto the shafts as a unit to facilitate reassembly of the mechanism.

While the differential drive mechanism of the present invention has particular application in racing vehicles, it should be apparent that the mechanism also has utility in more conventional vehicles. For example, such a differential would make it more practical to use a conventional passenger vehicle for such tasks as pulling trailers, traveling over rugged terrain, or the like. Further, since all of the spur gears interconnecting the input and pinion shafts are completely interchangeable, insolong as the gears are employed in mating pairs, then the number of spare parts necessary to be stocked is reduced in half, making the mechanism economical to manufacture and maintain.

The use of the neutral position for the shifting crown gear coupling mechanism is of particular importance on race vehicles since it eliminates the necessity for a transmission or in-and-out box. This is important not only from the standpoint of economics and safety for the driver, but also from the standpoint of providing additional room in the cockpit.

While I have disclosed a preferred embodiment of my invention, I wish it understood that I do not intend to be restricted solely thereto, but rather that I do no intent to include all embodiments thereof which would be apparent to one skilled in the art and which come within the sphere and scope of my invention.

I claim:

1. A differential drive gear mechanism for a vehicle comprising rising a housing, an access opening in one wall of said housing, a removable cover plate mounted on said housing and sealing said access opening, an input shaft extending into said housing through an opening in another wall thereof, a pinion shaft within said housing, bearing means in said housing journaling said input shaft and said pinion shaft for rotation about spaced parallel axes, first and second drive gears, means mounting said drive gears on said input shaft, first and second driven gears, means mounting said driven gears on said pinion shaft with said first driven gear meshing with first drive gear and said second driven gear meshing with said second drive gear, said gears mounted on one of said shafts being mounted for free rotation thereon and said gears mounted on the other of said shafts being connected thereto for rotation therewith, and coupling means operable to selectively couple one or the other of said gears on said one shaft to said one shaft for rotation therewith, said gears each being removable from said housing through said access opening upon removal of said cover plate.

2. The differential drive gear mechanism defined in claim 1 wherein said coupling means comprises a coupling member mounted on said one of said shafts for rotation therewith and for axial movement therealong to alternatively couple said one of said shafts to one or the other of the gears mounted thereon.

3. The differential drive mechanism defined in claim 2 wherein said coupling means further comprises actuator means operably connected to said coupling member and movable between first and second coupling positions to alternatively couple said one of said shafts to one or the other of said gears mounted thereon and an uncoupled position in which said one of said shaft is uncoupled from both of said gears mounted thereon.

4. The differential drive mechanism defined in claim 1 wherein said drive gears are fixed on said input shaft for rotation therewith and said driven gears are mounted for free rotation on said pinion shaft.

5. The differential drive mechanism defined in claim 4 wherein said drive gears are mounted on said input shaft in axially spaced relation to one another and said driven gears are mounted on said pinion shaft in axially spaced relation to one another, and wherein said coupling means includes a coupling member and means mounting said coupling member on said pinion shaft intermediate said driven gears for rotation with said pinion shaft and for axial movement therealong.

6. The differential drive gear mechanism defined in claim 5 wherein said coupling means comprises a yolk engaging said coupling member, actuator means operatively connected to said yolk for moving said coupling member axially along said pinion shaft, and detent means for releasably retaining said actuator in a first coupling position in which said coupling member is engaged with said first driven gear, a second coupling position in which said coupling member is engaged with said second driven gear, and an uncoupled position in which said coupling member is disengaged from both said first and said second driven gears.

7. The differential drive gear mechanism defined in claim 6 wherein said coupling member comprises a crown gear having an annular row of crown gear teeth formed on both radial faces thereof and wherein said first and said second driven gears each have an annular row of crown gear teeth thereon in position to engage one row of gear teeth on said crown gear.

8. The differential drive gear mechanism defined in claim 6 wherein said bearing means comprises antifriction bearings supporting an end of said input and said pinion shafts adjacent said access opening.

9. The differential drive gear mechanism defined in claim 8 wherein said antifriction bearings are supported on said cover plate.

10. The differential drive gear mechanism defined in claim 1 wherein said means mounting said driven gears on said pinion shaft comprises a first elongated sleeve member splined on said pinion shaft for rotation therewith, said sleeve having an enlarged central portion having external splines formed thereon, an internally splined crown gear mounted on said central portion for rotation therewith and for axial movement therealong, said crown gear having an annular row of crown gear teeth formed on opposed radial faces of said driven gears, said driven gears being mounted for free rotation on opposed ends of said sleeve adjacent said central portion, and means for axially moving said crown gear axially along said enlarged portion to drivingly engage said driven gears alternatively, said sleeve being removable from said pinion shaft through said access opening to simultaneously remove both said driven gears from said pinion shaft.

11. The differential drive gear mechanism defined in claim 10 wherein said means mounting said driven gears on said input shaft comprises a second elongated sleeve member similar to said first sleeve member and splined on said input shaft for rotation therewith, an annular row of crown gear teeth formed on each of said driven gears, and a second crown gear member mounted on the central portion of said second sleeve, and second crown gear member engaging the crown gear teeth of both said driven gears to continuously lock said driven gears against rotation relative to said sleeve.

12. The differential drive gear mechanism defined in claim 11 wherein said drive gears and said driven gears are interchangeable whereby a drive gear may be installed on said pinion shaft as a driven gear, and a driven gear may be installed on said input shaft as a drive gear.

13. The differential drive gear mechanism defined in claim 12 wherein said coupling means comprises a yolk engaging said coupling member, actuator means operatively connected to said yolk for moving said coupling member axially along said pinion shaft, and detent means for releasably retaining said actuator in a first coupling position in which said coupling member is engaged with said first driven gear, a second coupling position in which said coupling member is engaged with said second driven gear, and an uncoupled position in which said coupling member is disengaged from both said first and said second driven gears.

* * * * *